2,871,271

PREPARATION OF TERTIARY ALIPHATIC TERPENE ALCOHOLS

Albert B. Booth, Jacksonville, Fla., assignor to The Glidden Company, Cleveland, Ohio, a corporation of Ohio No Drawing. Application January 15, 1953
Serial No. 331,515

16 Claims. (Cl. 260—614)

The present invention is directed to improvements in the preparation of aliphatic terpene alcohols and to certain new aliphatic alcohols. The invention is more particularly directed to the preparation of aliphatic terpene alcohols from myrcene.

Linalool and its allylomers, geraniol and nerol, are valuable odor chemicals. The occur in nature in certain essential oils but their availability is limited and supplies are uncertain and variable. Myrcene is a readily-available substance obtained by the pyrolysis of β-pinene, a constituent of gum turpentine, and it has been proposed to prepare linalool and its allylomers therefrom by the direct hydration of myrcene. Thus Milas, U. S. Patent 2,467,330, proposed to increase the yields of the desired products by conducting the hydration under non-oxidizing conditions. I have found, however, that this direct hydration procedure gives impractically small yields of alcohols and large yields of polymers, probably because the alcohols first formed are more subject to attack by the catalyst than was the original hydrocarbon.

Fornet, Seifensider, Zeitung, 63, 707, 739 (1936), in commenting upon the suggestion of Knoll and Wagner, Synthetische and Isolierte Reichstoffe, 2nd ed., p. 211, that the yields of linolool obtainable from Mexican linaloe oil can be increased by treating the terpenes, a myrcene containing mixture of hydrocarbons, remaining after acetylation of the oil, with dry hydrogen chloride in benzene and then treating the resulting chloride with anhydrous sodium acetate, states that the resulting products contain chlorine and are unsuitable for perfumery.

It is accordingly an object of the invention to provide an improved process for producing linalool and isomers thereof.

A further object is to provide an improved process for preparing aliphatic alcohols from myrcene.

An additional object is to provide certain new aliphatic alcohols.

Another object is to provide certain new odor chemicals.

Other objects will be apparent to those skilled in the art from the description of the invention which follows.

I have found that commercially satisfactory yields can be obtained in the indirect method of producing the aliphatic alcohols from myrcene provided the proper procedure is employed for the conversion of the chlorides to the alcohols.

In studying the conversion of the chlorides formed by treatment of myrcene with hydrogen chloride to the alcohols, a number of hydrolysis procedures were explored. Most of these were discarded because of excessive dehydrohalogenation or they were too slow and incomplete or they produced excessive deterioration of the initial hydrolysis products. Among such unsatisfactory hydrolysis procedures were (1) aqueous and alcoholic caustic, (2) sodium acetate in acetic acid, (3) sodium acetate in pyridine and (4) sodium acetate in methanol.

It has been found, however, that satisfactory results are obtained when the hydrolysis is carried out in a weakly alkaline aqueous medium provided intimate contact is maintained between the organic and aqueous phases. In some cases this requires good agitation and in others, due to the nature of the alkaline agent, only mild agitation is required. When properly conducted, the hydrolysis is substantially complete and the hydrolysis mixture, preferably after removal of a hydrocarbon forerun, is useful as an odor material. This is believed due to the fact that in addition to the alcohols formed, certain ethers are formed. It also appears that other fixatives not yet identified are also formed. Alternatively, the alcohol mixture can be fractionally distilled to obtain cuts of varying degrees of purity of the individual alcohols.

The aqueous hydrolytic agents which we have tried and found to be suitable are (1) aqueous potassium carbonate with good agitation, (2) aqueous sodium acetate with good agitation, and (3) calcium carbonate suspension in water with mild agitation. In the case of sodium acetate, the hydrolysis mixture usually contains about 20% of esters. The mixture can be used either as such or after saponification.

The finely-divided calcium carbonate acts as an emulsifier and only moderate agitation is required. The mixture is preferably slowly warmed to about 95° C. and held there until the evolution of $CO_2$ is complete. Evolution of $CO_2$ starts at about 60° C. and is complete in about 4 hours. The crude hydrolysis mixture contains about 60% alcohols when prepared from the crude mixture of halides, and in the case of the chlorides less than 1% of chlorine hydrolyzable by alcoholic KOH. Unreacted $CaCO_3$ is filtered off and can be recovered for reuse.

Hydrolyzable chlorine can be removed by heating with 10% solid KOH for one hour at 150° C., but this treatment will not completely dechlorinate any bornyl chloride present. Total removal of all chlorine can be accomplished by treatment with metallic sodium, but this treatment also partially reduces any conjugated double bond systems.

As stated above, the crude mixture contains about 60% of alcohols, composed roughly of ⅓ linalool, ⅓ terpineol and ⅓ myrcenol and nerol and traces of unidentified alcohols. The crude also contains about 20% of myrcene which is recoverable, unless the mixture is treated with sodium.

THE CHLORIDES

It has been found that hydrochlorination of myrcene can be effected by treatment with aqueous HCl as well as with dry HCl.

The addition of dry hydrogen chloride in the absence of a solvent was found to proceed readily at room temperature and to yield 3 chief products:

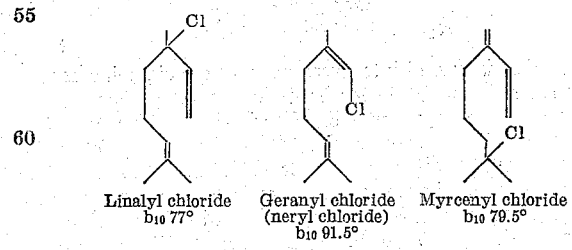

| Linalyl chloride | Geranyl chloride | Myrcenyl chloride |
| $b_{10}$ 77° | (neryl chloride) | $b_{10}$ 79.5° |
| | $b_{10}$ 91.5° | |
| A | B | C |

The term "geranyl chloride" will, unless the sense clearly indicates otherwise, be used herein to designate the open chain primary chloride B, although it might as well be neryl chloride. Although geranyl chloride has been known for a long time, having been made from linalool and geraniol, no one has, to the best of my knowledge, ever established whether it is cis or trans or a mixture of both forms.

It will be recognized that linalyl and geranyl chlorides are allylomers. Geranyl chloride is the more stable form but both yield the same products on hydrolysis; i. e., linalool and its cyclization product terpineol.

If myrcene is stirred with concentrated hydrochloric acid, it will also take up hydrogen chloride to yield geranyl and myrcenyl chlorides but no linalyl chloride. Of these three chlorides, only geranyl chloride has been characterized in the literature. The chloride derived from linalool was originally called linalyl chloride, but this was later shown to be the primary chloride. Probably in the majority of synthetic reactions, both chlorides would yield the same product. Geranyl chloride is the starting point for the synthesis of nerolidol and farnesol and of the carotenoids. It is likely that it or its derivatives can be cyclized to members of the cyclogeranyl series, which are the starting points for vitamin A synthesis.

CHARACTERIZATION OF THE CHLORIDES

Linalyl chloride is characterized by its conversion into linalool, and by its low boiling point as a tertiary chloride, being the lowest boiling of the three chlorides. Its infrared spectrum in the 0.25 mm. cell has a vinyl absorption at 783 cm.$^{-1}$ and an unusual absorption at 1412 cm.$^{-1}$. A similar peak is displayed by linalool. Other important absorptions are at 990 cm.$^{-1}$, 1077 cm.$^{-1}$ and 1170 cm.$^{-1}$. The conjugation absorption at 1590 cm.$^{-1}$ is absent as it should be.

Geranyl chloride is also characterized by conversion to linalool. Its high boiling point shows it to be a primary chloride. Its spectrum is characterized by lack of methylene and conjugated absorption. Its most characteristic absorption is a sharp peak at 1251 cm.$^{-1}$. It also has a broad absorption at 838 cm.$^{-1}$.

Myrcenyl chloride, as might be expected, has an infrared absorption spectrum very much like myrcene, with the large methylene absorption centered around 900 cm.$^{-1}$, the adjacent peak at 990 cm.$^{-1}$ and the conjugated absorption at 1590 cm.$^{-1}$. There is a good peak at 1112 cm.$^{-1}$, but it is very close to the weak absorption at 1106 cm.$^{-1}$ of myrcene. The most characteristic change is the splitting of the isopropylidene absorption at 1372 cm.$^{-1}$ to two points, 1364 cm.$^{-1}$ and 1383 cm.$^{-1}$. In myrcene, linalool, linalyl chloride and geraniol, this absorption is a point due to unsaturation there. The ultraviolet spectrum shows $\lambda$ max at 2240 A as in myrcene.

The evolution of HCl on distillation of the chloride reaction mixture has been observed, and it is likely that the dichlorides break down with heat to yield HCl and the monochlorides. When technical myrcene is used, there is also bornyl chloride from the pinene present and dipentene hydrochlorides.

PREPARATION OF THE CHLORIDES

Example I

DRY WAY

Dry HCl is passed into myrcene until a weight increase of one mole of HCl per mole of myrcene has been reached. The myrcene will absorb more if permitted. The absorption is exothermic. There is some difference in composition with the temperature, and the color is markedly better if the temperature is held down. Most of the experiments were conducted maintaining 25–30° C. as reaction temperature. Under these conditions, using technical myrcene, the crude before washing is purple, after washing is brown. When the theoretical weight increase has been reached, the crude was usually allowed to stand overnight, preferably kept cold. The crude was then shaken with soda ash solution and dried over anhydrous soda ash. Washing and drying loss has commonly been around 5%.

A crude so prepared from technical (80%) myrcene showed the following breakdown on distillation at 10 mm.:

|   | Percent |
|---|---|
| Recovered hydrocarbon (mostly myrcene) | 13.4 |
| Linalyl and myrcenyl chloride cut | 34.3 |
| Geranyl chloride cut | 31.2 |
| Higher boiling (to 112°/10 mm.) | 4.5 |
| Residue | 13.6 |
| Loss | 3.0 |
|   | 100.0 |

Using 95% myrcene and a reaction temperature of +10° C., working up the same way yielded:

|   | Percent |
|---|---|
| Recovered myrcene | 12.1 |
| Linalyl and myrcenyl chlorides | 33.4 |
| Geranyl chloride | 36.4 |
| Residue | 10.9 |
| Loss | 7.2 |
|   | 100.0 |

Using the purer myrcene, the purple color does not develop and the uptake of HCl is much slower. It is assumed that the uptake of HCl is catalyzed by traces of metal present in the technical product. These are removed when the material is purified by fractional distillation.

When the addition of HCl to technical myrcene is made at −10° to −20°, the color of the washed crude is yellow, not brown. This is of importance since it permits hydrolysis to yield a crude mixture of yellow alcohols, which would be much more readily marketable than brown alcohols.

Addition of HCl to plant myrcene at 90–100° C. was very slow. Color very dark. Infrared analysis showed less linalyl chloride present.

Example II

WET WAY

Stirring 136 g. (1 mole) myrcene 95% with 200 g. of aqueous hydrochloric acid (37% HCl), at room temperature for 24 hours, resulted in the uptake of 0.855 moles of HCl. The infrared spectrum of this crude showed myrcenyl and primary chlorides in good quantity but no linalyl chloride. Distillation of the mixture of chlorides prepared in this way yields myrcenyl chloride in abundance, uncontaminated by linalyl chloride.

THE ALCOHOLS

The alcohols derived from the hydrolysis of the myrcene hydrochlorides by means of $CaCO_3$ are:

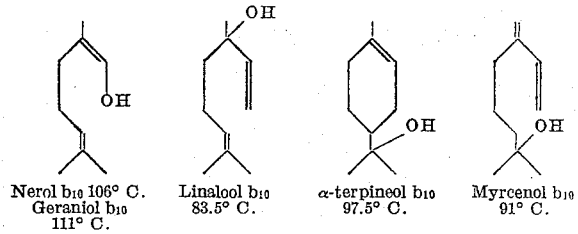

Nerol b$_{10}$ 106° C.  Linalool b$_{10}$ 83.5° C.  α-terpineol b$_{10}$ 97.5° C.  Myrcenol b$_{10}$ 91° C.
Geraniol b$_{10}$ 111° C.

The geraniol, nerol, linalool and α-terpineol are well-known alcohols. The myrcenol, however, is believed to be a new alcohol not heretofore described, and is not to be confused with the mixture obtained by the direct hydration of myrcene and later shown to be a mixture of linalool and terpineol, see Semmler, Ber. 38, 3128 (1901), or with the selenium dioxide oxidation products of myrcene. The myrcenol herein described is a tertiary conjugated alcohol, and on treatment with sodium and alcohol the conjugation is replaced by a single double bond. The dihydromyrcenol has a boiling point around 91° at 10 mm. and a refractive index of $n_D^{25}$ 1.458.

It has an odor much like linalool but with some terpineol character.

Chemically, myrcenol, like myrcene, is a 2-substituted butadiene and hence is properly termed "myrcenol." It may also be called 2-methyl-6-methylene-$\Delta^7$-octene-2-ol.

Myrcenol can only arise from the hydrolysis of myrcenyl chloride. It seems likely that the hydrolysis of these chlorides is a solvolysis rather than a displacement reaction. The solvolysis of myrcenyl chloride by water, however, is likely to lead to the corresponding alcohol without rearrangement, due to lack of complicating structures at that end of the molecule. This has been found to be so.

The infrared spectrum of myrcenol characterizes it fully: It has the large methylene absorption centered around 900 cm.$^{-1}$, the peak at 990 cm.$^{-1}$ and the conjugation absorption at 1590 cm.$^{-1}$, as have myrcene and myrcenyl chloride. Its unassociated hydroxyl absorptions are in the range assigned to tertiary alcohols, with peaks at 1125, 1152, and 1205 cm.$^{-1}$. It also has a moderately strong new absorption at 945 cm.$^{-1}$, not found in myrcene or mycenyl chloride. The U. V. maximum is at 2240 A. (in iso-octane), same as for myrcene and myrcenyl chloride. E=9600.

Geranyl chloride and linalyl chloride, on the other hand, are allylic chlorides. In this case, the carbonium ion resulting from chlorine removal by the solvent apparently prefers to accept the OH ion to form linalool, since considerable linalool but very little of the primary alcohol is formed.

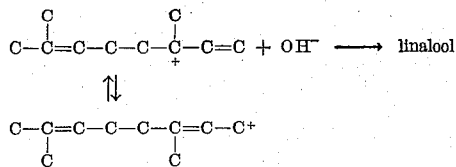

Apparently the reverse is true in going from the alcohol to the chloride, since the literature reports that geranyl chloride is the product obtained from either geraniol or linalool; see Simonsen, volume I, page 50, 63.

It is well known that linalool and nerol are readily cyclized to terpineol. Geraniol is, too, but less readily. In this laboratory some terpineol was always formed on hydrolysis of the myrcene hydrochlorides, even from purified myrcene. It appears that the above carbonium ion can undergo cyclization before accepting the OH$^-$ ion. When working with technical myrcene which contains dipentene, additional terpineol is produced from this source.

The primary alcohol appears to be principally nerol as it does not form a calcium chloride addition product, as does geraniol. Infrared spectra shed little light as the spectra of the two alcohols are nearly identical. The Raman spectra of these cis-trans isomerides are also reported to be almost identical; see Simonsen, volume I, page 54. The primary alcohol is formed in less than 5% yield but because of its high price, its recovery is of economic interest.

The infrared absorption spectra of the linalool and $\alpha$-terpineol from the process were the same as those of authentic samples.

The residue, after distilling out alcohols to a pot temperature of 200°/10 mm. can be steam stripped under vacuum to recover 20–25% of product. The residue remaining from this operation is odorless. The distillate contains a small amount of alcohol, nerol or geraniol, a small amount of terpin and is very rich in dineryl ether. This ether has a mild sweet odor and is valuable as a fixative for perfumery.

*Example III*

200 g. crude myrcene hydrochloride prepared by the addition of HCl to technical myrcene (1:1 molar ratio) was agitated vigorously with a solution of 240 g. $K_2CO_3 \cdot 1\frac{1}{2}H_2O$ in 800 g. water for 8 hours at 95–100° C.

180 g. of oil was recovered which showed about 60% alcohol by the infrared spectrogram and which assayed 0.69% hydrolyzable chlorine. Column distillation at 10 mm. yielded about 25% recovered hydrocarbon rich in myrcene, the alcohols to head temperature 109°/10 mm., and a residue of about 15% which still contained some alcohol.

The chlorine assay was carried out by (a) refluxing a sample with excess N/2 alcoholic KOH for 2 hours, as in the usual saponification number determination, or (b) when ester was present (Example IV), titrating back with N/2 nitric acid and then titrating the chloride ion with N/10 silver nitrate. From method (b) both chlorine and percent ester may be calculated.

*Example IV*

500 g. crude myrcene hydrochloride prepared by the addition of HCl gas to technical myrcene (1:1 molar ratio) was agitated vigorously with a solution of 500 g. sodium acetate in 500 g. water at 100° for 10 hours. The oil layer weighed 460 g. and showed 1.4% chlorine and about 20% ester by method (b) of Example III and by infrared spectrogram. This mixture was saponified in order to have all the alcohol free, and column distilled, yielding hydrocarbon, alcohols and residue in roughly the same proportions as in Example III.

*Example V*

181 g. of a geranyl chloride cut from the mixture of myrcene hydrochlorides was warmed slowly and agitated with 105 g. calcium carbonate precipitated chalk and 600 g. water, warming slowly to 90°. After 4 hours the water layer contained approximately the theoretical amount of chlorine and the reaction was stopped. The recovered oil layer weighed 160 g. and assayed 0.49% chlorine. The infrared absorption spectrum showed that the oil contained about 60% of linalool plus small amounts of the other tertiary alcohols.

*Example VI*

38 g. of a tertiary chloride fraction from the distillation of myrcene hydrochlorides was warmed slowly to 80° while stirring with 22 g. calcium carbonate (precipitated chalk) and 220 g. water until the water layer contained about the theoretical amount of chlorine. 35 g. of oil was recovered. Infrared analysis showed that the oil contained about 75% of terpene alcohols, mostly linalool and myrcenol.

*Example VII*

2165 g. of myrcene hydrochloride prepared by adding a molar equivalent of HCl gas to technical myrcene at −10° to −20° C. was hydrolyzed by agitating with 925 g. calcium carbonate and about 9 liters of water, heating gradually to 100° for 4 hours. 1897 g. of oil and 365 g. of calcium carbonate were recovered. The oil was light in color and assayed about 60% alcohol by infrared. The assay of the crude for total alcohol content may also be carried out by chemical methods, especially the dimethyl aniline-acetyl chloride method of Fiore. This procedure is especially good for sensitive alcohols like linalool and myrcenol. It gives values fairly close to the infrared assay. Straight acetylation results in excessive dehydration.

*Example VIII*

6 lb. 6 oz. of myrcene hydrochlorides prepared by the addition of 1 equivalent of gaseous HCl to technical myrcene at room temperature, was stirred with 3 lb. 12 oz. of precipitated calcium carbonate and 33 lbs. of water, warming slowly to 80° and holding at that temperature. Total time, 8 hours.

The oil layer weighed 5 lbs. 8 oz. and was column distilled at 10 mm. After removal of hydrocarbons amounting to about 30% of the crude, 1 lb. 6½ oz. of crude linalool was obtained. The linalool was followed by myrcenol, then α-terpineol, then nerol, to a head temperature of 108°/10 mm. and a pot temperature of 200°. A residue of 14% of the charge remained at this point. More primary alcohol, dineryl ether, and a small amount of terpin were obtained from the residue (see Example IX).

The crude linalool was heated with 10% of its weight of solid (90%) KOH at 150° to remove hydrolyzable chlorine. Careful fractionation of the oil recovered from this operation, to separate from bornyl chloride which is not removed by the KOH, yielded pure linalool, free of chlorine.

Linalool so prepared is of excellent odor quality and spectrally identical to properly purified natural linalool.

Example IX 1 lb. of residue from a production like Example VIII was distilled with a current of steam at 15 mm. absolute pressure and a pot temperature of 150°. Two cuts were taken. The first cut, 66 g., deposited crystals of terpin hydrate on standing over the water condensate. After filtering off the terpin hydrate, a few grams, the infrared spectrum showed a little primary alcohol (nerol) but mostly the ether. The second cut, 118 g., showed no alcohol and was principally, if not exclusively, ether. Its infrared spectrum showed the broad and deep ether absorption centered at 1070 cm.$^{-1}$ and the absorption at 1372 cm.$^{-1}$ was a point indicating an isopropylidene group. Methylene and conjugation were absent. The weak but broad absorption at 830 cm.$^{-1}$ apparently corresponds to the weak nerol/geraniol absorption at 835 and the geranyl chloride (neryl chloride) absorption at 838 cm.$^{-1}$. The medium absorption at 889 cm.$^{-1}$ apparently is the same as the very weak absorption at the same position in nerol or geraniol. The residue from the steam distillation was not examined further. Because of its viscous nature it contributes fixative properties to the mixture of alcohols.

These spectral data indicate that the ether is either geranyl or neryl ether. It is reasonable to assign the same configuration to the ether as to the primary alcohol as they are both derived from the same source, and the alcohol has been shown to be nerol by non-formation of the calcium chloride compound.

Example X 23 g. of sodium was melted under toluene and 323 g. crude alcohols, prepared by hydrolyzing the usual mixture of myrcene hydrochlorides and then distilling off most of the myrcene, was fed in with agitation over 50 minutes, then stirred 1 hour at 100–110° C. and let stand overnight. A little sodium remained. The resulting product, after washing and removal of the toluene, showed about 80% alcohols by infrared and gave a negative test for chlorine by the Beilstein flame test. Only a trace of conjugated unsaturation remained. On careful fractionation of this mixture the dihydro myrcenol was obtained with not more than traces of terpineol or linalool, boiling at about 91°/10 mm. Unlike myrcenol itself, which polymerizes readily, the dihydromyrcenol exhibits normal stability on storage. Dihydromyrcenol is probably a mixture of isomers, differing in the way the conjugated system has been reduced. The infrared absorption spectrum shows dihydromyrcenol to be a non-conjugated tertiary alcohol. Description of its absorption bands is not very meaningful as these are likely to vary with different percentages of the isomeric forms, but certain characteristic linalool and terpineol bands are either altogether missing or are present in trace amounts only, thus showing the individuality of dihydromyrcenol from linalool or α-terpineol.

It will be understood that the foregoing examples are merely illustrative and that many variations can be made therein without departing from the spirit of the invention.

It has been indicated that the mixtures formed on hydrolysis are useful without fractionation. Where fractionation of the hydrolysis mixture is not employed, it may be desirable to fractionate the halide mixture to remove the hydrocarbons and leave a residue, so that upon hydrolysis of the halide fractions, the concentration of alcohols is increased. However, fractionation of hydrolysis mixture is generally preferred whether the alcohols are to be separated from each other or not. Moreover, hydrolysis of the myrcenyl chloride cut from chlorides obtained from the use of aqueous HCl is uncontaminated with other tertiary alcohols and use of such a procedure results in high purity myrcenol.

In the specification and claims, the term "myrcenol" is used to refer to 2-methyl-6-methylene-Δ$^7$-octene-2-ol, and the term "myrcenyl" means the

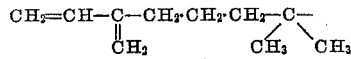

radical.

Having described the invention, what is claimed is:

1. The process for producing tertiary aliphatic alcohols of the empirical formula $C_{10}H_{17}OH$, which comprises hydrolyzing a monochloride formed by the monohydrochlorination of myrcene by heating the same in a weakly alkaline aqueous medium consisting essentially of water with sufficient agitation to maintain intimate contact between the aqueous and organic phases.

2. The process of claim 1 in which the hydrolyzing medium is a slurry of $CaCO_3$.

3. The process for producing tertiary aliphatic alcohols of the empirical formula $C_{10}H_{17}OH$ which comprises hydrolyzing the mixture of chlorides formed by the monohydrochlorination of myrcene by heating said mixture in a weakly alkaline aqueous medium consisting essentially of water with sufficient agitation to maintain intimate contact between the aqueous and organic phases.

4. The process of claim 3 in which the hydrolyzing medium is a slurry of $CaCO_3$.

5. The process for producing tertiary aliphatic alcohols of the empirical formula $C_{10}H_{17}OH$ which comprises hydrolyzing a mixture comprising linalyl chloride, geranyl chloride and myrcenyl chloride by heating the same in a weakly alkaline aqueous medium consisting essentially of water with sufficient agitation to maintain intimate contact between the aqueous and organic phases.

6. The process for producing tertiary aliphatic alcohols of the empirical formula $C_{10}H_{17}OH$ which comprises hydrolyzing a mixture comprising linalyl chloride, geranyl chloride and myrcenyl chloride by heating the same in a weakly alkaline aqueous medium consisting essentially of water with sufficient agitation to maintain intimate contact between the aqueous and organic phases and thereafter fractionally distilling the hydrolysis mixture to recover therefrom alcohols of the empirical formula $C_{10}H_{17}OH$.

7. The process for producing tertiary aliphatic alcohols of the empirical formula $C_{10}H_{17}OH$ which comprises hydrolyzing the mixture of chlorides resulting from the monohydrochlorination of myrcene by heating the same in a weakly alkaline aqueous medium consisting essentially of water with sufficient agitation to maintain intimate contact between the aqueous and organic phases, thereafter fractionally distilling the mixture to distill off alcohols of the empirical formula $C_{10}H_{17}OH$, and then steam stripping the residue under vacuum to recover a distillate rich in dineryl ether.

8. The process for producing tertiary aliphatic alcohols of the empirical formula $C_{10}H_{17}OH$ which comprises hydrolyzing the mixture of chlorides resulting from the monohydrochlorination of myrcene by heating the same in a weakly alkaline aqueous medium consisting essentially of water with sufficient agitation to maintain intimate contact between the aqueous and organic phases, heating the resulting crude alcohol mixture with KOH to remove remaining hydrolyzable chlorine, and heating the resulting mixture with metallic sodium to produce a chlorine-free mixture.

9. The process for producing tertiary aliphatic alcohols of the empirical formula $C_{10}H_{17}OH$ which comprises hydrolyzing the mixture of chlorides resulting from the monohydrochlorination of myrcene by heating the same in a weakly alkaline aqueous medium consisting essentially of water with sufficient agitation to maintain intimate contact between the aqueous and organic phases, heating the resulting mixture of crude alcohols with KOH to remove hydrolyzable chlorine and thereafter fractionating the mixture by distillation to recover separate fractions rich in linalool, 2-methyl-6-methylene-7-octene-2-ol, α-terpineol and primary alcohols of the formula

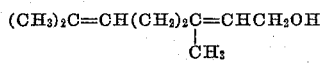

respectively.

10. The process for producing tertiary aliphatic alcohols of the empirical formula $C_{10}H_{17}OH$, which comprises hydrolyzing a monochloride selected from the class consisting of linalyl chloride, geranyl chloride, neryl chloride and myrcenyl chloride, and mixtures thereof, by heating the same in a weakly alkaline aqueous medium consisting essentially of water with sufficient agitation to maintain intimate contact between the aqueous and organic phases.

11. The process of claim 10 in which the aqueous medium is an aqueous solution of sodium acetate.

12. The process of claim 10 in which the aqueous medium is an aqueous solution of $K_2CO_3$.

13. The process of claim 10 in which the aqueous medium is an aqueous slurry of $CaCO_3$.

14. The process for producing tertiary aliphatic alcohols of the empirical formula $C_{10}H_{17}OH$ which comprises hydrolyzing the mixture of chlorides formed by the monohydrochlorination of myrcene by heating said mixture in a weakly alkaline aqueous medium consisting essentially of water with sufficient agitation to maintain intimate contact between the aqueous and organc phases, separating the aqueous phase from the organic phase containing a mixture of alcohols, heating the mixture of alcohols with metallic sodium to remove non-hydrolyzable chlorine, thereafter distilling alcohol from the mixture under vacuum, and then steam stripping the residue under vacuum to recover a distillate therefrom.

15. The process for producing tertiary aliphatic alcohols of the empirical formula $C_{10}H_{17}OH$ which comprises treating myrcene with aqueous HCl to form myrcene monohydrochloride and then heating the resulting myrcene hydrochloride in a weakly alkaline aqueous medium consisting essentially of water with agitation sufficient to maintain intimate contact between the aqueous and organic phases.

16. The process for forming myrcene monohydrochloride which comprises treating myrcene with aqueous HCl until not more than an equimolecular amount of HCl has reacted with the myrcene.

References Cited in the file of this patent

UNITED STATES PATENTS

| | | |
|---|---|---|
| 1,766,369 | Bassett | June 24, 1930 |
| 1,971,743 | Bertsch | Aug. 28, 1934 |
| 1,984,725 | Britton et al. | Dec. 18, 1934 |
| 2,067,473 | Britton et al. | Jan. 12, 1937 |
| 2,072,015 | Tamele et al. | Feb. 23, 1937 |
| 2,417,220 | Smith et al. | Mar. 11, 1947 |
| 2,467,330 | Milas | Apr. 12, 1949 |
| 2,609,388 | Knapp et al. | Sept. 2, 1952 |
| 2,626,962 | Schmerling | Jan. 27, 1953 |

FOREIGN PATENTS

| | | |
|---|---|---|
| 532,614 | Great Britain | Jan. 28, 1941 |

OTHER REFERENCES

Fornet: Seifensieder Zeitung, volume 63 (1936), page 740.

Weygand: "Organic Preparation," Interscience, New York, 1945; pp. 5, 154–5.

Vogel: "Practical Organic Chemistry," Longmans, New York, 1948; p. 289.

Lucas et al.: Principles and Practices in Organic Chemistry, Wiley & Sons, New York, 1949; page 209.

Rasmussen et al.: J. A. C. S., volume 71 (1949), 1068, 1073.

Bull. Soc. Chim. France (Du Pont et al.), 1949, pages 310–314.

Bateman et al.: J. Chem. Soc. (London), 1950, pages 3045–3056.

Simonsen: The Terpenes, Cambridge Press, 1953; pages 63–4, 19, 68–70.

Simonsen (of record), pp. 57, 65 added.

Bellamy: The Infra-red Spectra of Complex Molecules, Wiley & Sons, New York (1954); pages 31–46 and 83–96.

Chemical Abstracts (Lebedeva), vol. 39, page 4288[1].

Hine: "Physical Organic Chemistry," McGraw-Hill, New York, 1956; pp. 93–105.